(12) United States Patent
Liaw et al.

(10) Patent No.: US 7,856,570 B1
(45) Date of Patent: Dec. 21, 2010

(54) METHOD AND APPARATUS FOR SHAPING ELECTRONIC PULSES

(75) Inventors: Haw-Jyh Liaw, Fremont, CA (US); Shwetabh Verma, Sunnyvale, CA (US)

(73) Assignee: NetLogic Microsystems, Inc., Santa Clara, CA (US)

( * ) Notice: Subject to any disclaimer, the term of this patent is extended or adjusted under 35 U.S.C. 154(b) by 732 days.

(21) Appl. No.: 11/844,836

(22) Filed: Aug. 24, 2007

(51) Int. Cl.
  *G06F 1/00* (2006.01)
  *H04L 7/00* (2006.01)
(52) U.S. Cl. .................................. 713/500; 713/401
(58) Field of Classification Search ............. 713/500, 713/401
  See application file for complete search history.

(56) References Cited

U.S. PATENT DOCUMENTS

| | | | | |
|---|---|---|---|---|
| 5,128,627 | A * | 7/1992 | Wendt | 330/51 |
| 6,853,691 | B1 * | 2/2005 | Kim | 375/308 |
| 6,956,989 | B2 * | 10/2005 | Van Tuyl | 385/24 |
| 7,012,477 | B2 * | 3/2006 | Harron et al. | 332/108 |
| 7,068,881 | B2 * | 6/2006 | Yoo | 385/31 |
| 7,212,580 | B2 * | 5/2007 | Hietala et | 375/293 |
| 7,245,805 | B2 * | 7/2007 | Alfano et al. | 385/122 |

* cited by examiner

*Primary Examiner*—Suresh K Suryawanshi
(74) *Attorney, Agent, or Firm*—Stattler-Suh PC

(57) ABSTRACT

A method and system for shaping an electronic pulse with a two-pulse response. An input node receives an initial electronic pulse and splits the electronic pulse into a first path and a second path. An output node combines together the first path and the second path into an output path, and transmits a shaped electronic pulse, matched to an output impedance. An Ethernet chip generates two pulses and transmits the pulses along a first path and a second path respectively. A power combiner/splitter combines together the pulses along the first path and the second path into an output path, and transmits a shaped electronic pulse, matched to an output impedance.

16 Claims, 7 Drawing Sheets

400

500

METHOD AND APPARATUS FOR SHAPING ELECTRONIC PULSES

FIELD OF INVENTION

The invention relates to methods and systems for shaping electronic pulses. More specifically, the invention relates to methods and apparatuses for generation of stress pulses for testing electronic receivers.

BACKGROUND OF INVENTION

As the demand for better connectivity to the internet grows, there is an ever increasing need for greater bandwidth. Therefore, modern communication systems have been optimized to achieve higher data rates. As the data rates increase, reliable communication becomes difficult due to signal integrity constraints. The channel through which the data is transmitted has limited bandwidth and other physical impairments, such as dispersion.

Electronic receivers with built-in filtering capability attempt to overcome some of these physical limitations, and have superior performance. In testing the performance of such receivers under laboratory conditions, there is a need to generate a wide range of artificially distorted pulses. The collection of these 'stress-test' pulses should cover the range of channels the receiver is likely to encounter. A generic two-pulse response can be used to model a wide range of channel responses. This can be done varying the shapes of the two pulses, and their relative amplitudes and spacing. Embodiments of the present invention deal with the artificial generation of stress-test pulses with a two-pulse response.

A conventional method to generate a generic two pulse-response is to use a feed-forward network. The circuit is shown in FIG. 2. A band-limited input source is split into two paths through a matched resistive power splitter/combiner of Δ or Y configuration. The differential delay between the two paths is controlled to generate the proper spacing for the final desired pulse. The resulting pulses are then buffered by high-speed isolation amplifiers, which are matched on both ports. These isolation amplifiers ensure that the path from the input to the output is unidirectional. The amplifiers may have different gains to generate a wide variety of pulse shapes.

The buffered pulses are then merged together via another resistive combiner to drive the output. Any returning pulses which do not go towards the output are terminated at the outputs of the high-speed amplifiers. Without the high-speed amplifiers, signals which couple from one path into the other will re-circulate and corrupt the final output signal. One such path is shown in FIG. 3.

One drawback of using this approach is the need for discrete high-speed amplifiers. For 10 Gigabit Ethernet signals, the bandwidth of these high-speed amplifiers may need to be 5 GHz or higher. Such amplifiers are expensive, and without the active amplifiers, the effect of these re-circulating signals can be mitigated by the insertion of passive attenuators in the two data paths. The result is an uncomfortable tradeoff between mitigation of the runt pulses, and desired signal amplitude.

Accordingly, there remains a need for a system and method that generates generic two pulse responses preferably without the use of expensive, high speed off-chip amplifiers. Embodiments of the present invention disclose a method and apparatus for artificial generation of a generic two pulse response without using such amplifiers.

SUMMARY OF INVENTION

In one embodiment of the present invention, is disclosed a system for shaping an electronic pulse with a two-pulse response, the system comprising an input node for receiving an initial electronic pulse with an associated source impedance and splitting the electrical path into two electrical paths comprising a first path and a second path; an output node for combining together the first path, the second path and the output path, and for transmitting a shaped electronic pulse, wherein the first path comprises a first module for establishing a characteristic impedance substantially equal to twice the source impedance and introducing a first time delay, a matched passive attenuator with substantially identical bidirectional gain, matched to the characteristic path impedance, for reducing the amplitude of a received electronic pulse, a first resistive element coupling the output of the matched attenuator with the second node. Further, the second path comprises a second module for establishing a characteristic impedance substantially equal to twice the source impedance and for introducing a second time delay; a second resistive element coupling the output of the second module with the second node wherein the spacing of the two-pulse response is shaped by the difference between the total time delay associated with the first path and the total time delay associated with the second path, and the relative amplitudes associated with the two-pulse response are shaped by the matched attenuator.

Another embodiment of the present invention discloses a method and system for artificial generation of stress test pulses with a two pulse response, comprising two individual pulse sources, wherein each pulse source is derived from an Ethernet chip. Further, the embodiment comprises a first path comprising a first module for establishing a characteristic impedance and introducing a first time delay in said first path, a second path comprising a second module for establishing a characteristic impedance and introducing a second time delay in said second path, and a power combiner/splitter for combining together the first path and the second path into an output path, and for transmitting a shaped electronic pulse, matched to an output impedance. The Ethernet chip further comprises a clock port with a multiplexor in its path, which multiplexor selects either valid data, or a clock signal, allowing only one of the said either valid data or clock signal to pass through; delay element, located in a data path, which delay element matches the delay of the multiplexor in the clock path; and digital to analog converters in a multiplexor output path and in a data path.

DETAILED DESCRIPTION OF THE INVENTION

Figure 1:
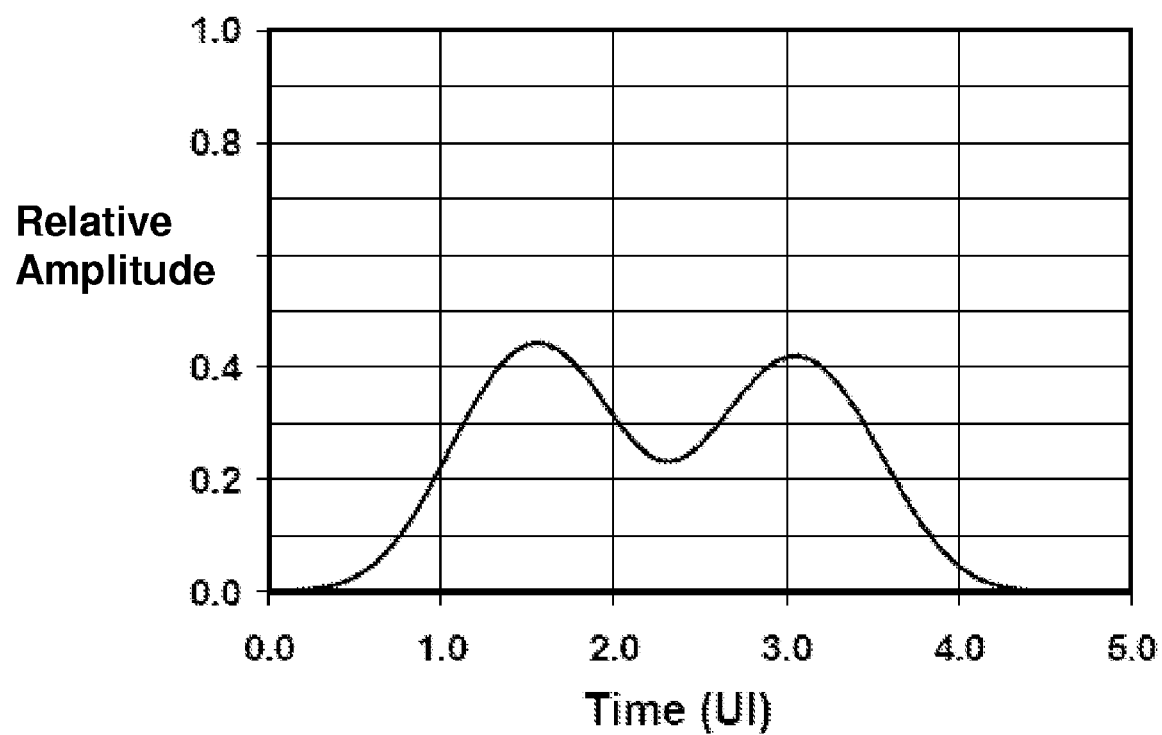
FIG. 1 illustrates a symmetric stress pulse as defined by IEEE 802.aq

FIG. 1 illustrates a typical symmetric stress pulse as defined by IEEE 802.aq. However, other pulses could also be generated. Embodiments of the present invention could be used for production screening of electronic devices, such as electronic receivers to see if the tested devices meet particular specifications. By using various other pulses, further tests can be conducted to characterize device quality. Embodiments of the invention could also be integrated into a field device for diagnosing defective receiver modules such as Electronic dispersion receivers.

Figure 2:
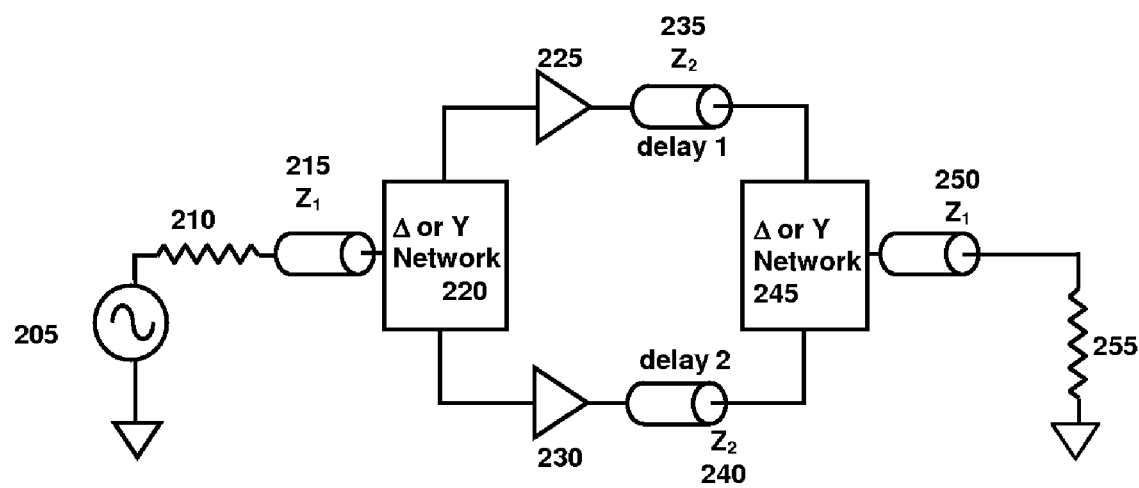
FIG. 2 illustrates a prior art feed-forward network to generate a symmetric stress pulse.

FIG. 2 illustrates an example of a conventional prior art method which uses a feed-forward network to generate a two pulse response. A band-limited input source 205 is split into two paths through a matched resistive power splitter/combiner 220 of Δ or Y configuration. The differential delay between the two paths is controlled to generate the proper spacing for the final desired pulse.

Figure 3:
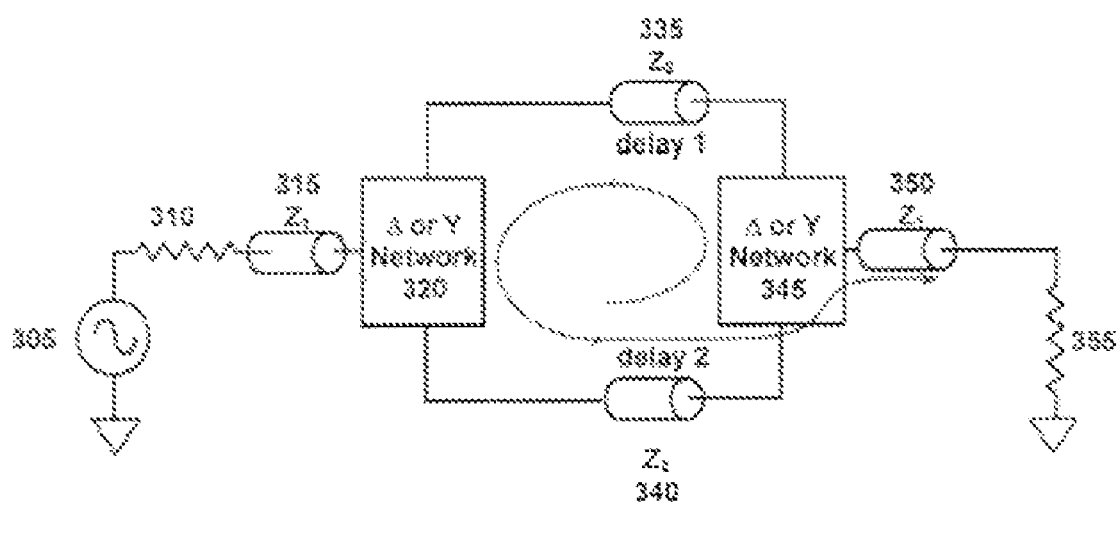
FIG. 3 illustrates one possible runt path without isolation amplifiers.

The resulting pulses are then buffered by high-speed amplifiers 225 and 230, which are matched on both ports. These isolation amplifiers 225 and 230 ensure that the path from the input to the output is unidirectional. These amplifiers also may have different gains to generate a wide variety of pulse shapes. The buffered pulses are then merged together via another resistive combiner 245 to drive the output. Any returning pulses which do not go towards the output are terminated at the outputs of the high-speed amplifiers 225 and 230. Without the high-speed amplifiers 225 and 230, signals which couple from one path into the other will re-circulate and corrupt the final output signal. FIG. 3 illustrates one possible runt path without isolation amplifiers.

Figure 4A:
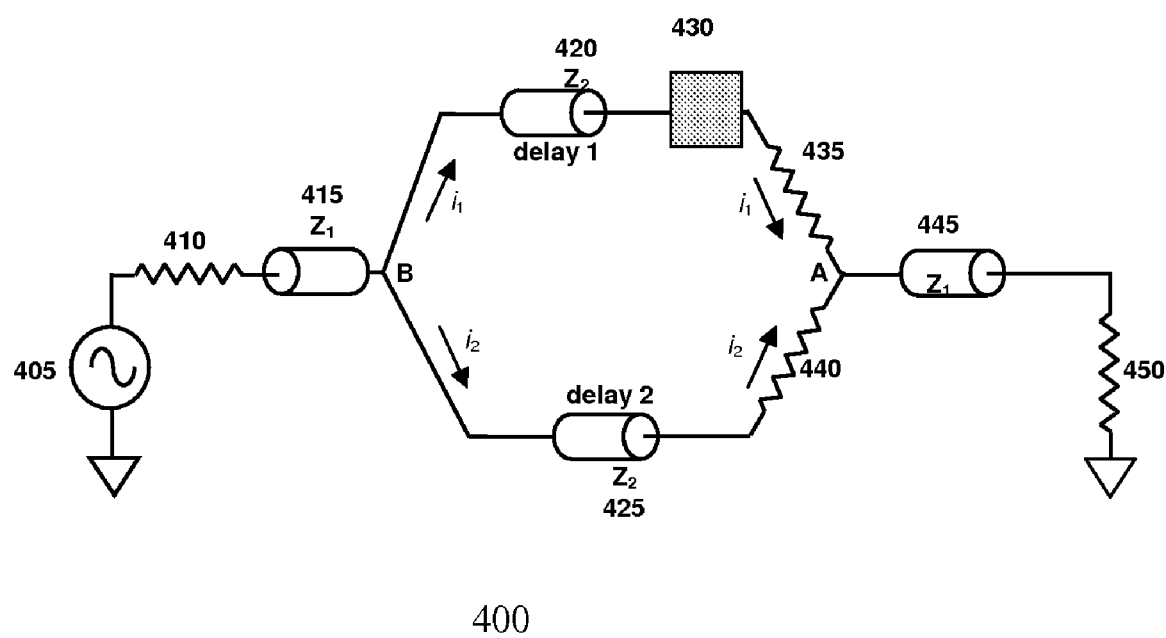
FIG. 4a illustrates a first solution for generation of a stress-test pulse.
Figure 4B:
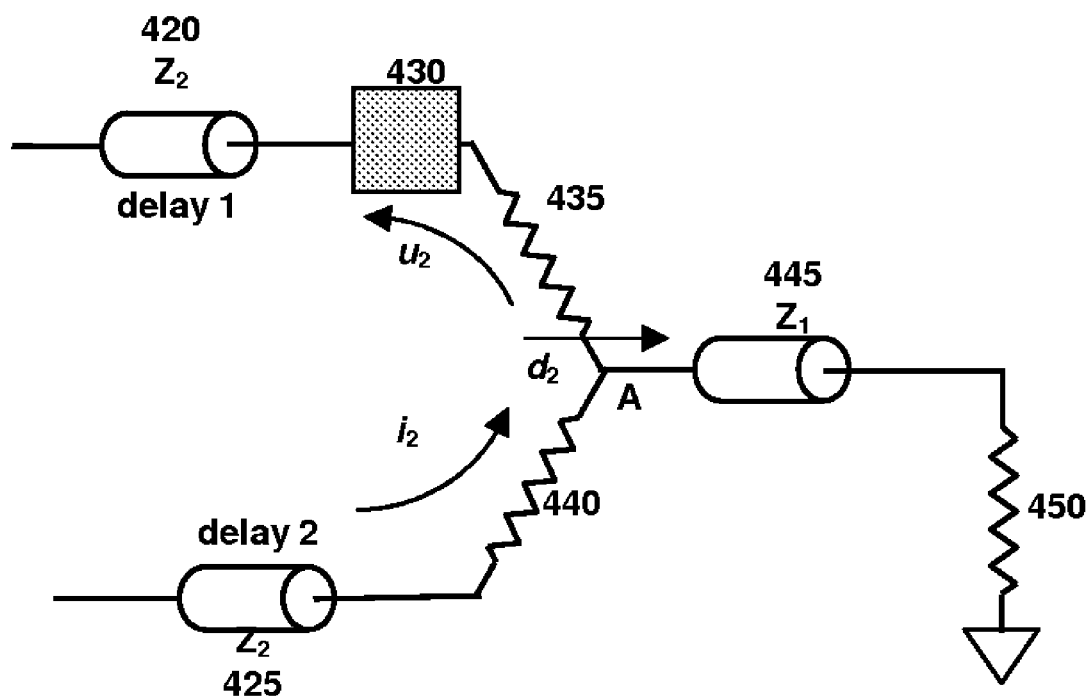
FIG. 4b illustrates incident and transmitted (desired and undesired) waves from a second path at a merge node.
Figure 4C:
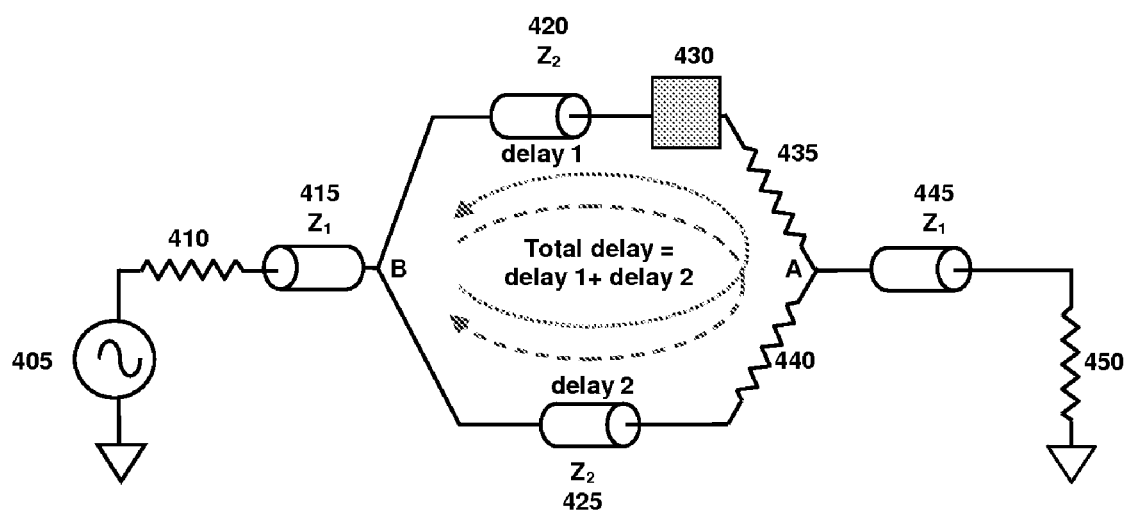
FIG. 4c illustrates convergent pulses having the same total delay.

FIGS. 4a-4c illustrate a method for generation of stress pulses, which uses a pulse cancellation technique to remove the runt pulses. An embodiment shown in FIG. 4a uses a novel power splitter and combiner configuration. A band limited source 405 creates the initial pulse. The pulse is then split at node 'B' along the top and bottom paths of the network, without any reflections. The transmission lines in two paths are designed to have different delays, and the upper path utilizes a passive attenuator 430 to reduce the relative amplitude of the signal by a pre-defined amount. Essentially, the relative amplitudes associated with the two-pulse response are set by the matched attenuator. The ports of the matched attenuator are matched to the characteristic path impedance. This matched attenuator 430 is designed to have identical bidirectional gain, and in a preferred embodiment, it is matched to 100Ω impedances on both ports.

The two pulses arrive at the merge node 'A' at different times. The spacing of the two pulse response is shaped by the difference between the total time delay associated with the first path and the total time delay associated with the second path. The resistive power combiner 435 and 440 at this interface ensures that there are no reflections from the incident pulse i, and forward-going undesired u and desired d pulses are launched in the two other paths, illustrated in FIG. 4b.

in a preferred embodiment, the characteristic impedances in the first and second paths are each substantially equal to twice the source impedance. Additionally, the source impedance is substantially equal to the output impedance. A preferred embodiment has the source impedance and the output impedance substantially fixed at 50 ohms, and the characteristic impedances in the first and second paths substantially equal to 100 ohms each. The resistive power combiner or resistive elements at the merge node, which resistive elements ensure that there are no reflections, are, in the preferred embodiment, substantially fixed at 62 ohms. The resistive power combiner values are calculated based on the characteristic impedance values of the various paths. The resistive power combiner values are arrived at from the following equation:

$$(Z2+X)//Z1+X=100 \text{ where } X//Y=(X*Y)/(X+Y); \text{ and}$$

where Z2 represents the characteristic impedance of paths 1 and 2, Z1 is the characteristic impedance of the output path, and X is the value of the resistive element. In a preferred embodiment, Z2=100 ohms, Z1=50 ohms, and thus X=62 ohms.

Therefore paths 1 and 2 each launch a pulse (for example, $d_2$ in FIG. 4b) towards the load 450, slightly delayed, thus creating the generic two-pulse shape. The undesired $u_1$ and $u_2$ pulses are canceled out at node 'B'. In a preferred embodiment, $u_1$ and $u_2$ re-converge at 'B' at the same instant, since both pulses see the same overall path delay.

FIG. 4c illustrates an embodiment wherein convergent pulses have the same total delay. Any delay through the passive attenuator 430 can be absorbed into Z1 (delay 1) 420. Also, the convergent pulses have the same amplitude, since they go through the same overall path. The impedance arrangement at node 'B' makes possible the merging together of two identical waves, traveling on branches 420 and 425, onto the segment 445, without any reflections. In a preferred embodiment, impedances 420 and 425 are 100Ω each, and the segment 445 is 50Ω.

In a preferred embodiment, there are no net reflected pulses, and a single, combined pulse is launched towards the source 405, which pulse terminates on its source resistor 410. If there is a mismatch between the amplitude and arrival time of the convergent pulses, reflections occur. These undesired reflected pulses would then ripple to the output. If the output is not well-matched to 50Ω, an additional passive attenuator can be inserted between node A, and the 50Ω load 450.

The advantage of the present embodiment is its controllability—the entire apparatus can be implemented on a printed circuit board, with very well-controlled delays in the upper and lower paths. Controlling the relative delays between the two paths is critical to create the desired pulse shape. The delay from the source stimulus to node 'B' is irrelevant, and does not have to be well-controlled. Similarly, the delay from node 'A' to the load does not have to be well-controlled.

A programmable passive attenuator can be used to attenuate one path relative to the other to create a time-varying shape for the resultant pulse. In another embodiment, dynamically changing the relative delays between the two paths is possible. Alternatively, additional fixed delay paths may be added between 'B' and 'A', and enabled/disabled via switches. Only any two paths may be active at a given time.

Figure 5:
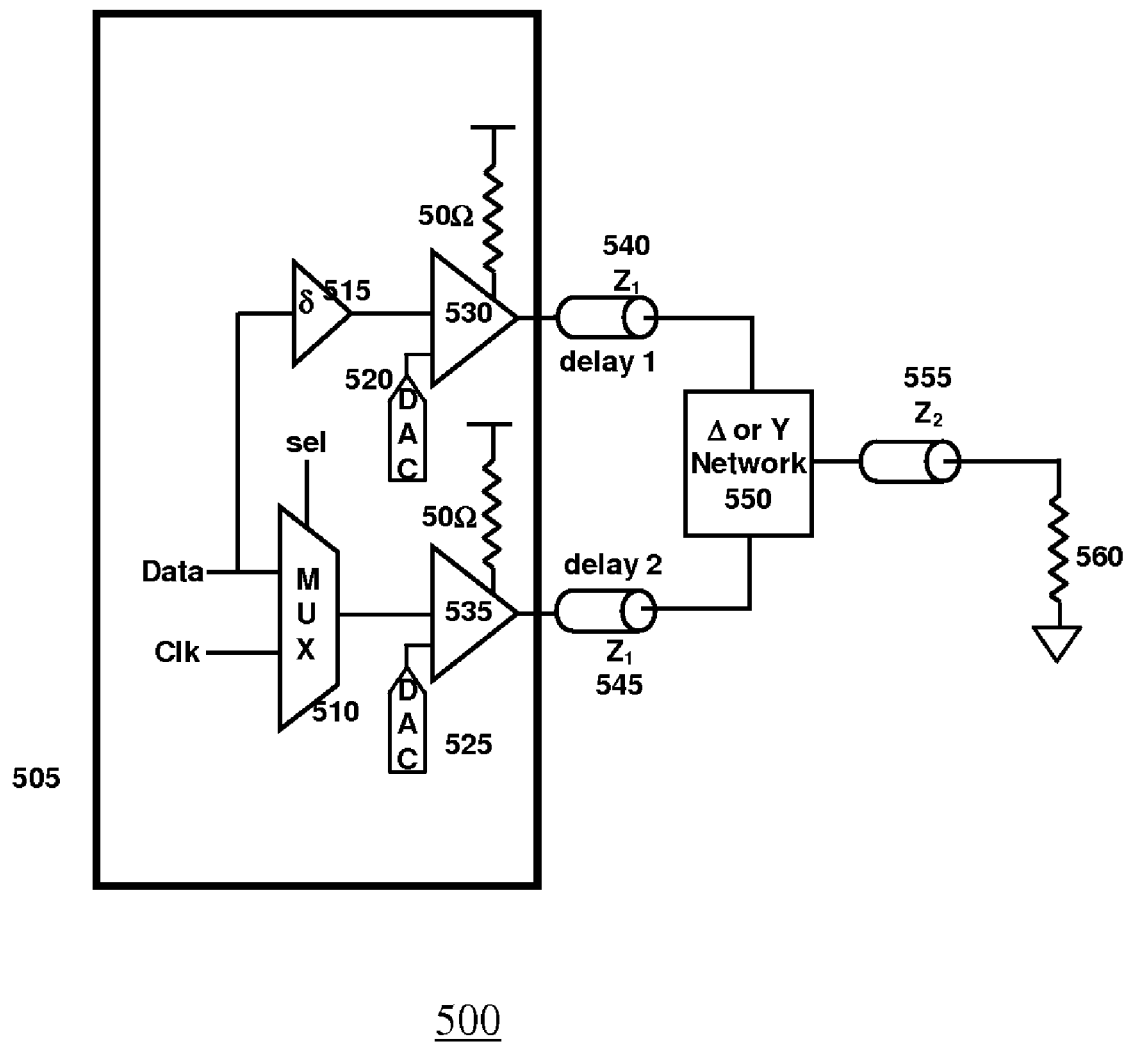
FIG. 5 illustrates a two pulse source, derived from an Ethernet chip.

FIG. 5 illustrates another embodiment for generation of a generic 2-pulse response. Rather than splitting the pulse from a single source, two pulse sources can be derived from the Ethernet chip 505. In a preferred embodiment, a 10-G Ethernet chip is used. The clock port on this chip has a multiplexor 510 in its path, which multiplexor selects either valid data or the clock signal to pass through. Since the delays between the clock and data paths need to be well-matched, the data path has an additional delay element 515 to match the delay of the multiplexor in the clock path. The magnitude of the swing in each path is tunable via independently controlled digital-to-analog converters (DACs) 520 and 525.

The two pulses from the chip source, with optional additional band-limiting, arrive at the power-combiner network 550 at different times. A Δ or Y resistive power combiner/splitter 550 at this interface ensures that all three of its ports 540, 545 and 555 (Z1, Z1, and Z2 respectively), are matched.

A preferred embodiment has all three ports 540, 545 and 555 at 50Ω. In a preferred embodiment, there are no reflections from the incident pulse, and forward-going pulses are launched in the two other paths. The configuration comprises an output node for combining together the first path, the second path and the output path, and for transmitting a shaped electronic pulse, matched to output impedance 555. In a preferred embodiment, the output impedance 555 is substantially equal to the input impedance 540 and 545. This interface is similar to node 'A' in FIG. 4b, which dealt with the first method for creating a generic two-pulse response. The desired pulse launches towards the load 560, and an undesired pulse returns towards the source in the opposite path. The desired pulses from the two paths are appropriately delayed and have the correct relative magnitudes, thus creating the composite stress-test pulse. The undesired returning pulses are terminated at the source resistors.

The order of the steps in the foregoing described methods of the invention is not intended to limit the invention; the steps may be rearranged. The embodiments described eliminate the need for expensive, discrete high-speed amplifiers, which amplifiers of 5 GHz or higher may be needed for 10 Gigabit Ethernet signals. The described embodiments also eliminate the need for an uncomfortable trade-off between mitigation of runt pulses and desired signal amplitude, which tradeoff would have been necessary when the use of discrete high-speed amplifiers is eliminated.

Foregoing described embodiments of the invention are provided as illustrations and descriptions. They are not intended to limit the invention to the precise form described. In particular, it is contemplated that functional implementation of the invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by Claims following.

What is claimed is:

1. A method and system for shaping an electronic pulse with a two-pulse response, comprising:

An input node for receiving an initial electronic pulse with an associated source impedance, said input node splitting the electronic pulse into a first path and a second path;

an output node for combining together the first path and the second path into an output path, and for transmitting a shaped electronic pulse;

wherein:

the first path comprises:

a first module for establishing a characteristic input impedance and introducing a first time delay;

a matched passive attenuator with substantially identical bidirectional gain, matched to the characteristic path impedance, for reducing the amplitude of a received electronic pulse;

a first resistive element coupling the output of the matched attenuator with the second node; and, the second path comprises:

a second module for establishing a characteristic input impedance and introducing a second time delay;

a second resistive element coupling the output of the second module with the second node.

2. The method and system of claim 1 wherein the characteristic impedance in the first path is substantially equal to twice the source impedance.

3. The method and system of claim 1 wherein the characteristic impedance in the second path is substantially equal to twice the source impedance.

4. The method and system of claim 1 wherein the ports of the matched attenuator are matched to characteristic impedance of the path.

5. The method and system of claim 1 wherein the spacing of the two-pulse response is shaped by the difference between the total time delay associated with the first path and the total time delay associated with the second path.

6. The method and system of claim 1 wherein the relative amplitudes associated with the two-pulse response are shaped by the matched attenuator.

7. The method and system of claim 1 wherein the source impedance is substantially equal to the output impedance.

8. The method and system of claim 1 wherein the source impedance is substantially equal to 50 ohms.

9. The method and system of claim 1 wherein the characteristics impedance in the first path is substantially equal to 100 ohms.

10. The method and system of claim 1 wherein the characteristic impedance in the second path is substantially equal to 100 ohms.

11. The method and system of claim 1 wherein the output impedance is substantially equal to 50 ohms.

12. The method and system of claim 1 wherein the first resistive element is substantially equal to 62 ohms.

13. The method and system of claim 1 wherein the second resistive element is substantially equal to 62 ohms.

14. The system of claim 1 further comprising: an additional passive attenuator inserted between the output node and a resistive load.

15. The system of claim 1 wherein the said passive attenuator is a static passive attenuator.

16. The system of claim 1 wherein the said passive attenuator is a dynamic, programmable passive attenuator.

* * * * *